Patented Dec. 4, 1928.

1,694,212

UNITED STATES PATENT OFFICE.

ALBERT C. FISCHER, OF CHICAGO, ILLINOIS.

EXPANSION JOINT.

No Drawing.  Application filed October 16, 1925. Serial No. 62,907.

Heretofore various compositions of matter have been incorporated in bituminous mixtures to form expansion joints. My invention consists of compounding mixtures with materials which can be cut into various forms and which when incorporated in a mass of bituminous matter or any other ductile substance, retain more or less of the flat structure when incorporated spreading itself over the ductile mass, thus strengthening the mass while at the same time retarding flow.

By building up a structure of this material and incorporating same in a mass of ductile substance, a laminated form can be created, so that the mass when rolled in sheets has the appearance of a shale-like formation containing repeated layers of strip-like particles which spread themselves over small areas of the ductile substance, lending strength thereto.

My invention relates particularly in the utilization of raw materials which enable one to prepare this mass at a very small cost by using raw materials which now constitute waste, and other materials which are left on the ground to rot or used as fuel.

I am particularly referring to corn husks which may be cut in small sections or strips, say ½" x 2" in length or any convenient size, so that the dried corn husk or shredded pieces or corn husk will act as a strengthening means to a ductile mass, over which it may be laid or in which it may be incorporated. In this mixture may be other sub-divided fibrous material or the husks may be incorporated in a green state in the mass or may be incorporated in a dried state. Care must be exercised that the ductile material is not too hot in order not to char the husk material. This necessitates heating to a temperature or incorporating the husks at a temperature which will not char the vegetable matter. An elastic substance may also be used which becomes ductile at warmer temperatures, permitting the materials cited to be incorporated therein.

A suitable formula for preparing this mass before rolling into a flat sheet is that of 30% husk material and 70% ductile material. Another formula is that of 20% husk material, 10% sub-divided fibrous material and 70% ductile material. This material may be either extruded into flat sheet form or it may be pressed between suitable rolls into flat sheet form or may be drawn between belts to a flat sheet form. The structure of the mass would be different under the three operations. By extruding the mass a general mixture would be obtained, flat husklike particles spreading in every direction. Likewise the fibrous matter spreading in every direction.

If drawn between rolls with belts, the mass would straighten itself out into flat laminated layers caused by the inflow of the ductile substance between belts. Likewise the fibrous matter would have a tendency to straighten itself out causing a flow of the fibrous matter and the flake-like particles in a longitudinal direction.

This laminated structure so created is a desirable feature, as it increases the area of flat surface which the flat husk particles come in contact with, thus adding strength to that ductile mass or the area of such mass with which the flat husk particle comes in contact.

When pressed between rolls without belts, the formation is pretty much the same as obtained by the extrusion method. All three forms of mechanical devices are on the market, so that it is not necessary to describe in detail the machinery as extrusion machines, pressing rolls and belted rolls are easily obtainable.

The invention and art involved are in the use of the materials in their particular shape and in the results obtained by the use of the respective classes of machinery. To my knowledge there is no product on the market in which the result is obtained that is obtained by this mixture, and therefore I claim as original and new, expansion joints as described above.

I claim:

1. A preformed expansion joint comprising a ductile, waterproofing binder and corn husks homogeneously incorporated therein, with said corn husks arranged in substantially irregularly overlapping layers and the proportion of the binder exceeding that of the husks.

2. A preformed expansion joint comprising ductile waterproofing binder having shredded corn husks incorporated therein, with said corn husks arranged substantially parallel and in overlapping layers and the proportion of the binder exceeding that of the husks.

3. Preformed expansion joint comprising ductile waterproofing binder having flat surfaced corn husks and relatively finely divided fibrous material incorporated therein, there being a greater proportion of binder.

4. Preformed expansion joint comprising bituminous binder having flat surfaced shredded corn husks and relatively finely divided fibrous material incorporated therein, there being a greater proportion of binder.

5. Preformed constructional material including approximately 70 per cent ductile waterproofing binder, having approximately 30 per cent flat surfaced corn husk pieces uniformly incorporated therein.

6. Preformed constructional material including ductile waterproofing binder having corn husks of relatively large surface areas incorporated therein, the binder being in excess of 50 per cent.

7. Preformed constructional material including ductile waterproofing binder having uniformly incorporated therein flat, relatively wide, vegetable reinforcing and flow retarding elements, the binder being in excess of 50 per cent.

8. Preformed constructional material comprising approximately 70 per cent bituminous binder having incorporated therein flat, relatively wide, vegetable reinforcing and flow retarding elements, said elements being arranged in laminated formation and comprising from 20 to 30 per cent of the constructional material.

In testimony whereof I have signed my name to this specification this 8th day of October, 1925.

ALBERT C. FISCHER.